(12) United States Patent
Dale

(10) Patent No.: US 9,962,308 B2
(45) Date of Patent: May 8, 2018

(54) WATER THERAPY SYSTEM AND DEVICE

(71) Applicant: James John Dale, Gilbert, AZ (US)

(72) Inventor: James John Dale, Gilbert, AZ (US)

( * ) Notice: Subject to any disclaimer, the term of this patent is extended or adjusted under 35 U.S.C. 154(b) by 149 days.

(21) Appl. No.: 15/078,466

(22) Filed: Mar. 23, 2016

(65) Prior Publication Data
US 2017/0216123 A1    Aug. 3, 2017

Related U.S. Application Data

(60) Provisional application No. 62/288,847, filed on Jan. 29, 2016.

(51) Int. Cl.
| | |
|---|---|
| A47K 3/022 | (2006.01) |
| A61H 35/00 | (2006.01) |
| E03C 1/00 | (2006.01) |
| A61G 15/02 | (2006.01) |
| A61H 33/00 | (2006.01) |
| F16M 11/42 | (2006.01) |
| A47C 1/02 | (2006.01) |

(52) U.S. Cl.
CPC ............... *A61G 15/02* (2013.01); *A47C 1/02* (2013.01); *A61H 33/00* (2013.01); *F16M 11/42* (2013.01)

(58) Field of Classification Search
CPC .......... A61G 15/02; A47C 1/02; A61H 33/00; A61H 35/006; F16M 11/42; A47B 3/00; A47K 17/02; A47K 17/028
USPC ........................................................... 4/622
See application file for complete search history.

(56) References Cited

U.S. PATENT DOCUMENTS

| | | |
|---|---|---|
| 5,005,560 A | 4/1991 | Quam et al. |
| 5,501,682 A | 3/1996 | Edwards-Cofie |
| 6,036,663 A | 3/2000 | Arzt |
| 6,139,512 A | 10/2000 | Ricchio |
| 6,327,721 B1 | 12/2001 | Devereaux et al. |
| 6,805,678 B2 | 10/2004 | Cafaro |
| 7,065,808 B2 | 6/2006 | Leung et al. |
| 7,832,800 B2 | 11/2010 | Lo |
| 8,316,476 B2 | 11/2012 | Gardenier |
| 9,198,827 B1 | 12/2015 | Robinson |

*Primary Examiner* — Benjamin R Shaw

(74) *Attorney, Agent, or Firm* — IDP Patent Services; Olav M. Underdal

(57) ABSTRACT

A water therapy system, including a therapy chair with a tiltable backrest portion, and a foot tub, including a water bucket and an inclined ramp, such that a patient can be lying in the therapy chair with lower legs and feet extended into the water bucket, such that an inclination angle of the inclined ramp ensures a comfortable seating position. Also disclosed is an inclined ramp for holding a water bucket for use in reflexology therapy, including an inclined surface and a base, such that the inclined surface is configured to hold a water bucket.

13 Claims, 5 Drawing Sheets

Inclined Ramp

Therapy System

US 9,962,308 B2

WATER THERAPY SYSTEM AND DEVICE

CROSS-REFERENCE TO RELATED APPLICATIONS

This application claims the benefit of U.S. Provisional Application No. 62/288,847, filed Jan. 29, 2016.

FIELD OF THE INVENTION

The present invention relates generally to the field of chairs and benches for massage therapy and more particularly to methods and systems for reflexology treatment which include use of a foot tub with water.

BACKGROUND OF THE INVENTION

Reflexology, or zone therapy, is the physical practice of massaging, squeezing, or pushing on parts of the feet, or sometimes the hands and ears, with the goal of encouraging a beneficial effect on other parts of the body, or to improve general health. It is based on a system of zones and reflex areas that reflect an image of the body on the feet and hands with a premise that such work effects a physical change to the body.

During a reflexology session a therapist may begin by placing a patient's feet in a foot tub of warm/hot water, which in some applications can be mixed with a Chinese herbal tea, while the patient is placed in a ¾ reclined position. However, while placed in this position the patient may experience some discomfort, since the legs typically hang at a 90-degree angle, extending into the foot tub, which can cause hyper extension, leading to lower back discomfort during the session.

As such, considering the foregoing, it may be appreciated that there continues to be a need for novel and improved devices and methods for reflexology and other therapy that includes use of a foot tub.

SUMMARY OF THE INVENTION

The foregoing needs are met, to a great extent, by the present invention, wherein in aspects of this invention, enhancements are provided to the existing model of for reflexology and other therapy that includes use of a foot tub.

In an aspect, an inclined ramp can include an inclined upper surface connected to a base such that the inclined upper surface is configured to hold a water bucket in a stable inclined position when positioned on the inclined upper surface while the base is positioned on a level floor surface.

In another aspect, a water therapy system can include:
a) a therapy chair, or table/bench, which can have a tiltable backrest; and
b) a foot tub, including a water bucket positioned on an inclined ramp;
wherein a patient can be seated or lying in the therapy chair, with lower legs and feet extended into the water bucket, such that an inclination angle of the inclined ramp ensures a comfortable seating position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Figure 1:
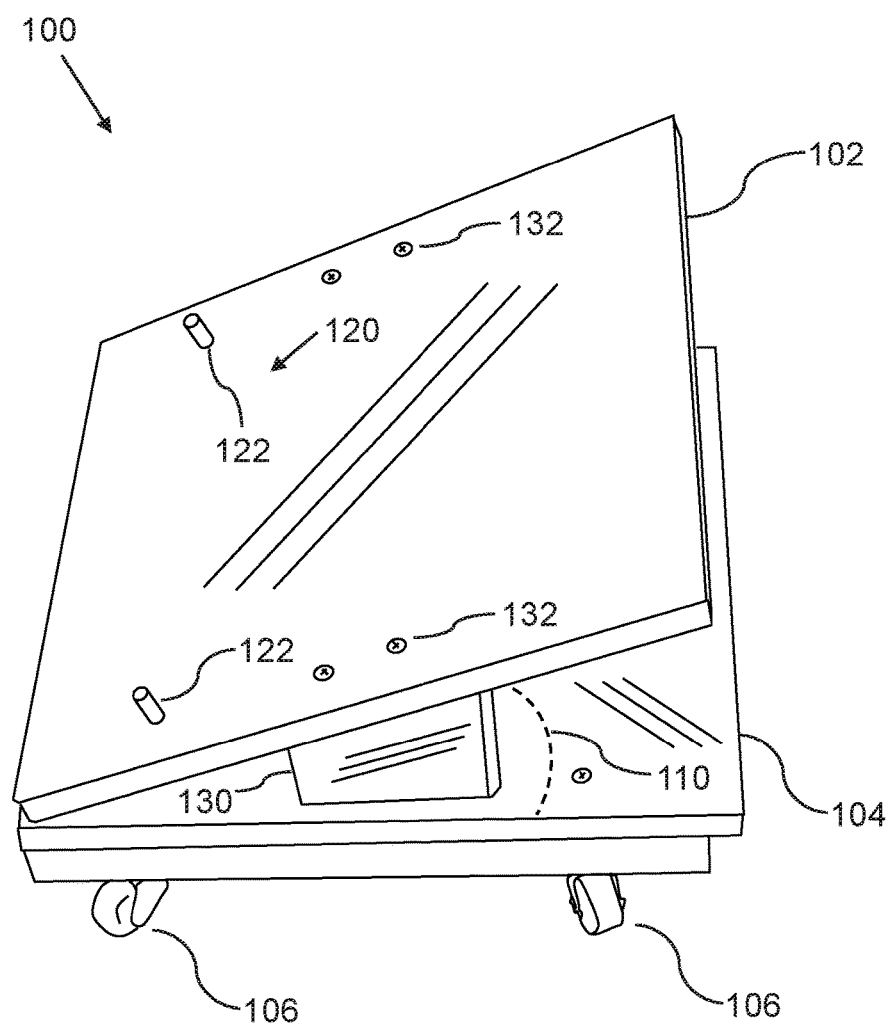
FIG. 1 is a perspective view of an inclined ramp, according to an embodiment of the invention.

In the following, we describe the structure of an embodiment of an inclined ramp 100 with reference to FIG. 1, in such manner that like reference numerals refer to like components throughout; a convention that we shall employ for the remainder of this specification.

In an embodiment an inclined ramp 100 can comprise:
a) an inclined upper surface 102; and
b) a base 104, wherein the inclined upper surface is connected to the base;
such that the inclined upper surface 102 is inclined relative to the base 104 at an inclination angle 110;
such that the inclined upper surface 102 is configured to receive a water bucket, so that the water bucket is in a stable inclined position when positioned on the inclined upper surface while the base 104 is positioned on a level floor surface. The inclined ramp 100 can also be referred to as The Ramp, The Little Ramp, or The Lil' Ramp.

In a related embodiment, the inclined upper surface 102 can be tilted with a 20-degree inclination angle, such that a water bucket is tilted towards the patient when a water bucket is positioned on the angled ramp 100.

In a related embodiment, the inclined upper surface 102 can be permanently mounted at a fixed inclination angle 110.

Figure 4:
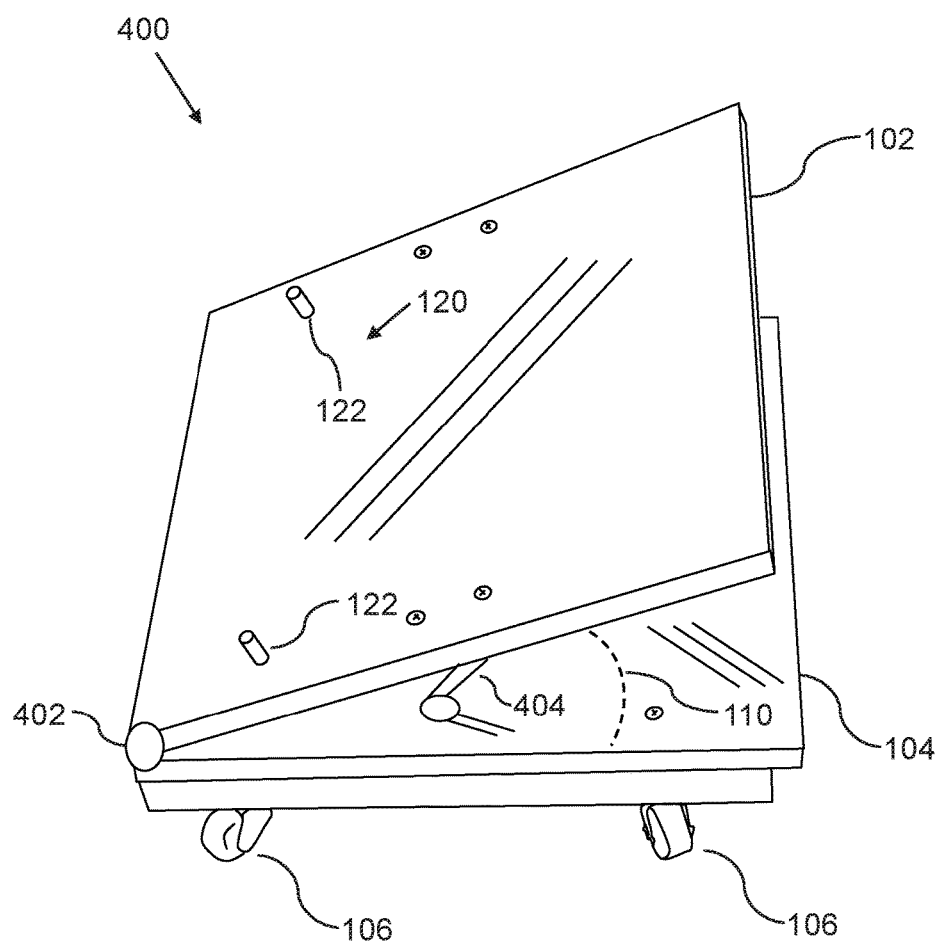
FIG. 4 is a perspective view of an inclined ramp, according to an embodiment of the invention.

In alternative embodiments, the inclination angle can be adjustable 110. FIG. 4 shows an example embodiment of an inclined ramp 400 with adjustable inclination angle 100, the inclined ramp 400 further comprising:

c) a rotatable connection 402, between the inclined upper surface 102; and the base 104, which as shown can be a hinge 402; and optionally
d) a pivot bracket 404, mounted between a bottom surface of the inclined upper surface 102 and a top surface of the base 104, which can be configured to provide resistance and lock the inclined surface in position.

In a related embodiment, the inclined ramp 400 can further include a bucket holder 120, mounted on an outer side of the inclined upper surface 102, which as shown for example can include two protruding screws, pegs or dowels 122, positioned in a lower end of the inclined upper surface.

In a further related embodiment, the wood dowels 122 can be positioned 4" from the bottom of the inclined upper surface 102, and 1" from the side, such that the dowels fits into slots of the inclined upper surface 102. Additionally, a screw or dowel may be positioned on a top of the inclined upper surface 102.

Figure 5:
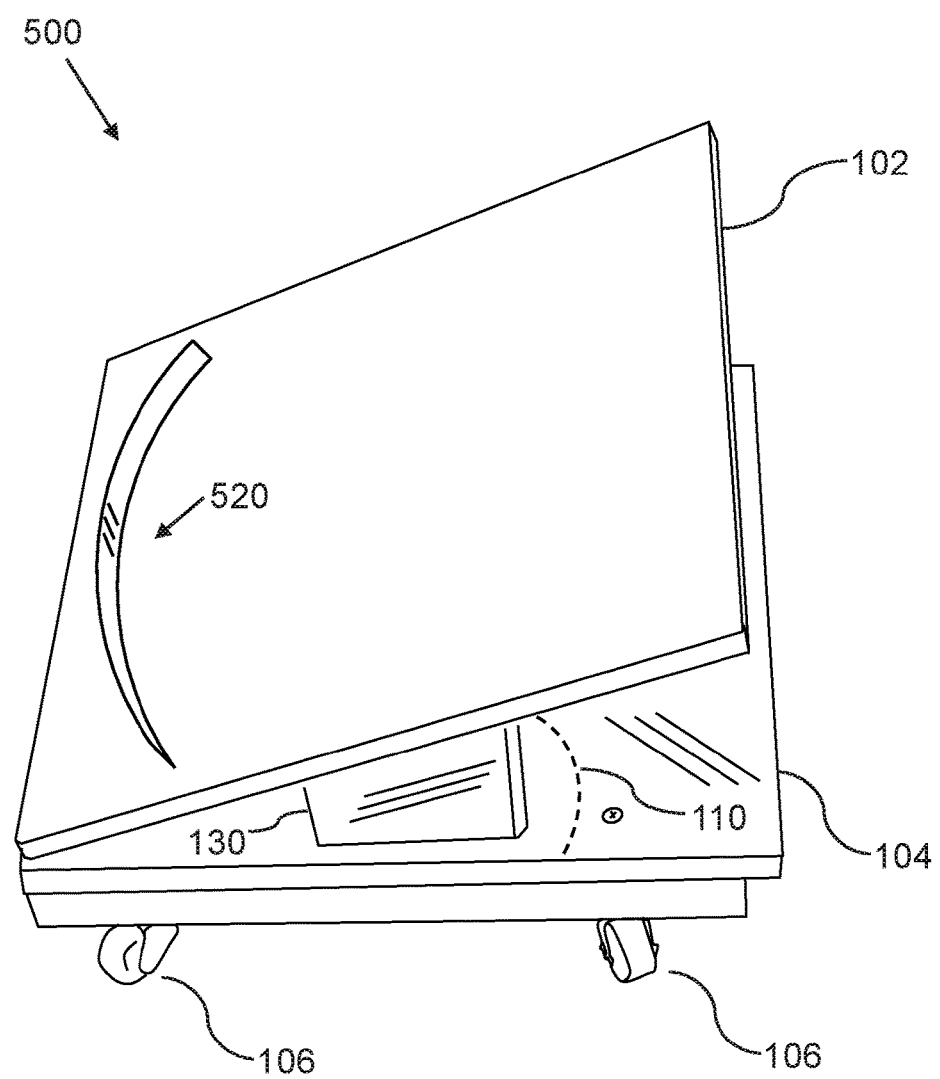
FIG. 5 is a perspective view of an inclined ramp, according to an embodiment of the invention.

In further related embodiments, the bucket holder 120 can have a plurality of different designs, such as for example including a shaped indentation, or alternatively a bucket holder ring or bucket holder partial ring 520, which is configured to receive the water bucket 222, such as shown in FIG. 5, which depicts an alternative embodiment of the inclined ramp 500.

In a related embodiment, the inclined ramp 100 can further include wheels 106, which can be mounted on an underside of the base 104. The wheels 106 can be caster wheels 106.

In a related embodiment, the inclined ramp 100 can further include a support structure 130, or block 130, which can be mounted between a bottom surface of the inclined upper surface 102 and a top surface of the base 104, to hold and stabilize the inclined upper surface 102 in a permanent position, such that the support structure 130 is secured in place with screws 132. The support structure 130 can have an inclined upper end to match the inclination angle of the inclined upper surface 102.

In a related embodiment, the inclined upper surface 102 can further include a top mounted linoleum tile, which for example can be a 12-inch by 12-inch tile, which is configured to protect the surface of the inclined upper surface 102.

Figure 2:
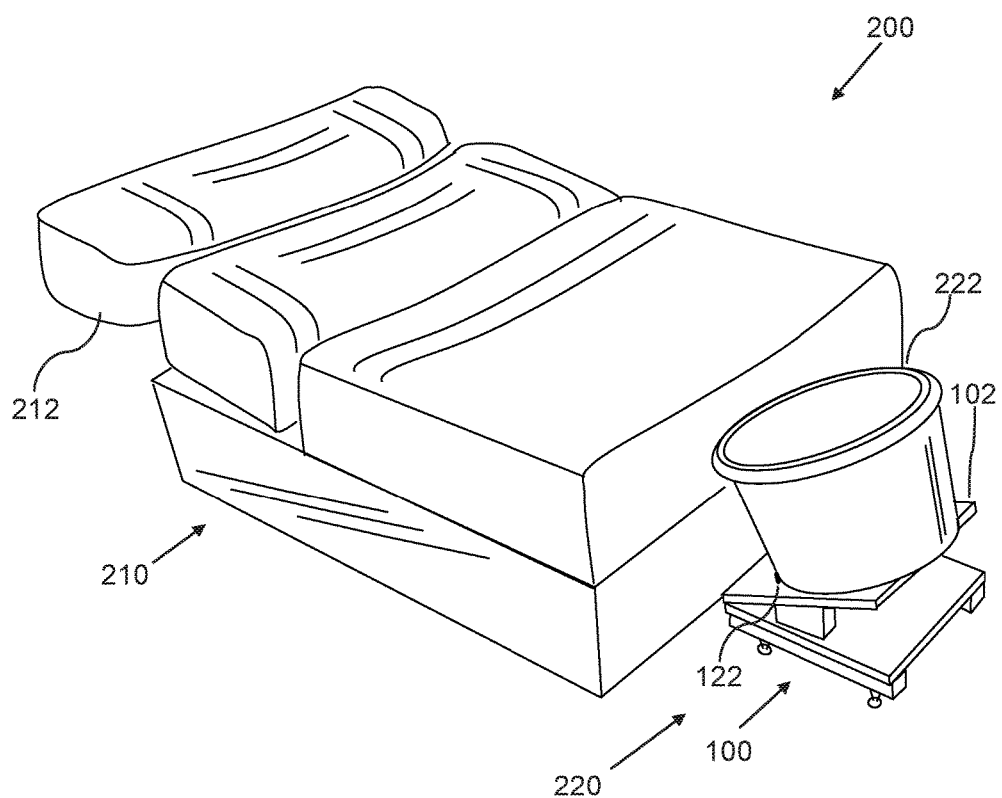
FIG. 2 is a is a perspective view of a water therapy system, according to an embodiment of the invention.

In an embodiment, as shown in FIG. 2, a therapy system 200, can include:

a) A therapy furniture piece 210, which can be therapy chair 210, or a therapy table or bench, or other type of furniture for sitting, leaning, or lying, which can include:
  i. a tiltable backrest portion 212; and
b) A foot tub 220, including
  i. A water bucket 222; and
  ii. An inclined ramp 100, wherein the water bucket 222 is positioned on the inclined upper surface 102 of the inclined ramp 100;

wherein a patient can be seated or lying in the therapy chair 210, with lower legs and feet extended into the water bucket 222, such that an inclination angle 110 (shown in FIG. 1) of the inclined ramp 100 ensures a comfortable seating position.

Figure 3:
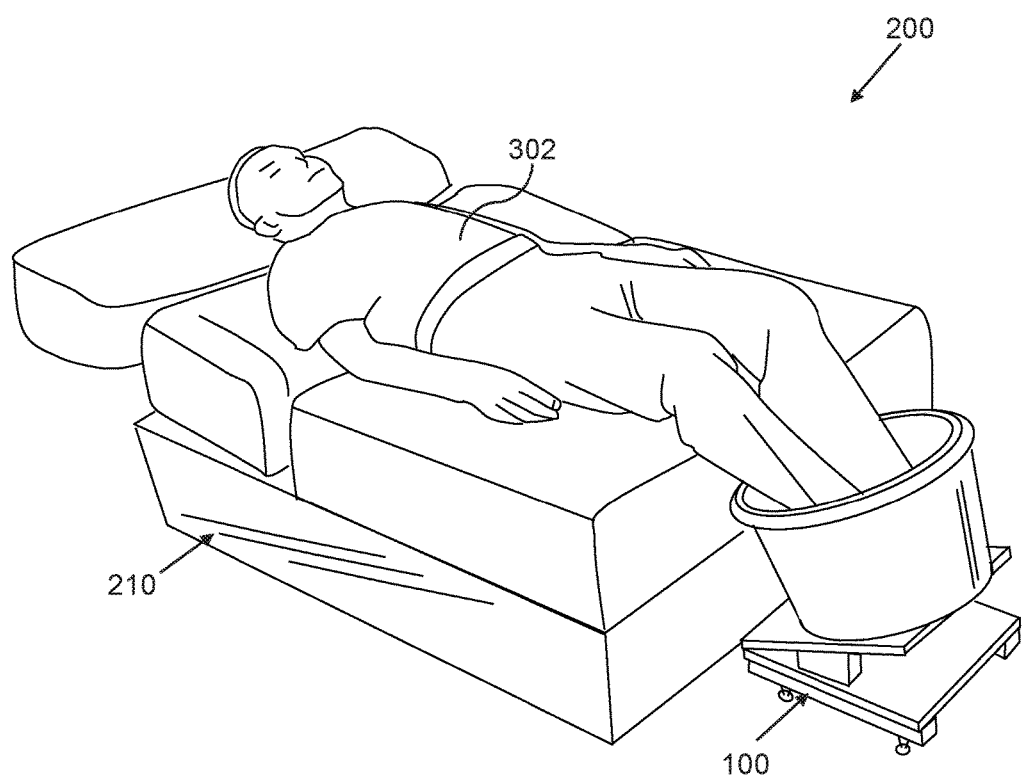
FIG. 3 is a is a perspective view of a water therapy system in use by a patient, according to an embodiment of the invention.

In a related embodiment, FIG. 3 shows the therapy system 200 with a patient 302 lying in the therapy chair 210, such that the tiltable backrest portion is tilted approximately 20 degrees.

In related embodiments, the water bucket 222 can be designed in a plurality of different shapes including circular and rectangular shapes.

Here has thus been described a multitude of embodiments of the inclined ramp 100, the therapy system 200, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A water therapy system, comprising:
a) a therapy furniture piece; and
b) a foot tub, including
  a water bucket; and
  an inclined ramp, further comprising:
    a bucket holder, mounted on an outer side of an inclined upper surface of the inclined ramp, wherein the bucket holder further includes two protruding dowels, which are positioned in a lower end of the inclined upper surface;
  such that the bucket holder is configured to hold the water bucket;
  wherein the water bucket is configured to be positioned on the inclined upper surface, such that the water bucket rests at an inclination angle of the inclined ramp;
whereby the water thereby system is configured to receive a patient to be seated or lying in the therapy furniture piece, with lower legs and feet extended into the water bucket.

2. The water therapy system of claim 1, wherein the therapy furniture piece further includes:
a tiltable backrest portion.

3. The water therapy system of claim 1, wherein the therapy furniture piece is a therapy chair.

4. The water therapy system of claim 1, wherein the inclined ramp further comprises:
a) an inclined upper surface; and
b) a base, wherein the inclined upper surface is connected to the base;
such that the inclined upper surface is inclined relative to the base at an inclination angle;
such that the inclined upper surface is configured to receive a water bucket, such that the water bucket is in an inclined position when positioned on the inclined upper surface while the base is positioned on a level floor surface.

5. The water therapy system of claim 4, wherein the inclined upper surface is permanently mounted at a fixed inclination angle.

6. The water therapy system of claim 4, wherein the inclination angle is adjustable.

7. The water therapy system of claim 5, wherein the fixed inclination angle is substantially 20 degrees.

8. The water therapy system of claim 4, further comprising a plurality of caster wheels, which are mounted on an underside of the base.

9. An inclined ramp, comprising:
a) an inclined upper surface;
b) a base, wherein the inclined upper surface is connected to the base; and
c) a bucket holder, mounted on an outer side of the inclined upper surface, wherein the bucket holder further includes two protruding dowels, which are positioned in a lower end of the inclined upper surface, such that the bucket holder is configured to hold a water bucket;

such that the inclined upper surface is inclined relative to the base at an inclination angle;

such that the inclined upper surface is configured to receive the water bucket, such that the water bucket is in an inclined position when positioned on the inclined upper surface while the base is positioned on a level floor surface.

10. The inclined ramp of claim 9, wherein the inclined upper surface is permanently mounted at a fixed inclination angle.

11. The inclined ramp of claim 9, wherein the inclination angle is adjustable.

12. The inclined ramp of claim 10, wherein the fixed inclination angle is substantially 20 degrees.

13. The inclined ramp of claim 9, further comprising a plurality of caster wheels, which are mounted on an underside of the base.

* * * * *